(12) United States Patent
Guidotti et al.

(10) Patent No.: US 11,736,595 B2
(45) Date of Patent: Aug. 22, 2023

(54) EXCHANGE OF MESSAGES SPLIT INTO FRAGMENTS FOR DIFFERENT RECIPIENTS ON CLIENT SIDE

(71) Applicant: INTERNATIONAL BUSINESS MACHINES CORPORATION, Armonk, NY (US)

(72) Inventors: Alice Guidotti, Rome (IT); Roberto Ragusa, Rome (IT); Leonardo Modeo, Rome (IT); Anna Pintus, Rome (IT); Matteo Filippo Corona, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/457,453

(22) Filed: Dec. 3, 2021

(65) Prior Publication Data
US 2023/0179687 A1 Jun. 8, 2023

(51) Int. Cl.
| | | |
|---|---|---|
| H04L 69/166 | (2022.01) | |
| H04L 12/18 | (2006.01) | |
| H04L 51/48 | (2022.01) | |
| H04L 51/214 | (2022.01) | |

(52) U.S. Cl.
CPC .......... *H04L 69/166* (2013.01); *H04L 12/18* (2013.01); *H04L 51/214* (2022.05); *H04L 51/48* (2022.05)

(58) Field of Classification Search
CPC ..... H04L 69/166; H04L 51/214; H04L 51/48; H04L 12/18
See application file for complete search history.

(56) References Cited

U.S. PATENT DOCUMENTS

| | | | |
|---|---|---|---|
| 6,044,395 A | 3/2000 | Costales | |
| 6,192,396 B1 | 2/2001 | Kohler | |
| 6,563,913 B1 | 5/2003 | Kaghazian | |
| 7,343,394 B2 | 3/2008 | Morreale | |
| 7,548,952 B2 | 6/2009 | Delia | |
| 7,953,805 B2 | 5/2011 | Gupta | |
| 10,021,054 B1 * | 7/2018 | Zhou | H04L 51/214 |

(Continued)

FOREIGN PATENT DOCUMENTS

DE 10318373 A1 12/2004

OTHER PUBLICATIONS

Disclosed Anonymously, "Method and system for inclusion of user specific private mail elements in an electronic mail system," ip.com, IPCOM000018958D, Published Aug. 22, 2003, https://priorart.ip.com/IPCOM/000018958.

(Continued)

*Primary Examiner* — Mohamed A. Wasel
(74) *Attorney, Agent, or Firm* — Grant Johnson

(57) ABSTRACT

A system and related method exchange messages under the control of a messaging client. The method comprises splitting a content of a source message into a plurality of fragments defined by corresponding portions of its content associated with different recipients of the message. A plurality of transport messages are generated, each comprising one or more of the fragments associated with the recipients. The transport messages are submitted to a messaging server for causing it to provide the transport messages to corresponding further messaging clients of the recipients for their aggregation. A computer program and a computer program product for performing the method are also provided.

19 Claims, 8 Drawing Sheets

(56) References Cited

U.S. PATENT DOCUMENTS

| | | | |
|---|---|---|---|
| 10,097,489 B2 * | 10/2018 | Lin | H04L 51/212 |
| 2006/0041624 A1 | 2/2006 | Lyle | |
| 2006/0253537 A1 * | 11/2006 | Thomas | G06Q 10/107 |
| | | | 709/206 |
| 2008/0077675 A1 * | 3/2008 | Graef | G06Q 10/107 |
| | | | 709/206 |
| 2008/0222257 A1 | 9/2008 | Mukherjee | |
| 2013/0084899 A1 * | 4/2013 | Li | H04W 4/06 |
| | | | 455/466 |

OTHER PUBLICATIONS

Disclosed Anonymously, "Method for Controlling Access to Portions of an Email Message," ip.com, IPCOM000224106D, Published Dec. 7, 2012, https://priorart.ip.com/IPCOM/000224106.

Disclosed Anonymously, "Variable Email Content Visibility Based on Specified Recipients," ip.com, IPCOM000261239D, Published Feb. 13, 2020, https://priorart.ip.com/IPCOM/000261239.

Restrict access to content by using sensitivity labels to apply encryption, Microsoft 365 Compliance, Published May 21, 2021, https://docs.microsoft.com/en-us/microsoft-365/compliance/encryption-sensitivity-labels?view=o365-worldwide. Retrieved from internet on May 31, 2021.

Yehuda Koren et al, "Method and System for Sending Distinct Portions of Email Content to Different Recipients," ip.com, IPCOM000222795D, Published Oct. 23, 2012, https://priorart.ip.com/IPCOM/000222795.

* cited by examiner

EXCHANGE OF MESSAGES SPLIT INTO FRAGMENTS FOR DIFFERENT RECIPIENTS ON CLIENT SIDE

BACKGROUND

The present disclosure relates to the information technology field. More specifically, this disclosure relates to exchange of messages.

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

Messages are commonly used to exchange information among users over a communication network. A typical example is an electronic mail (e-mail) service, which allows exchanging messages (referred to as e-mails) among users identified by corresponding e-mail addresses using the Simple Mail Transfer Protocol (SMTP).

Briefly, each e-mail comprises a textual subject-matter and an extensible list of additional entities, such as enclosures (non-textual objects to be embedded therein) or attachments (external files to be attached thereto). The e-mail is created by a user operating as a sender on a client thereof (either locally with an e-mail client application or remotely with a web-mail application running on a corresponding e-mail server); for this purpose, the sender edits a content of the e-mail and specifies one or more users being recipients thereof. The e-mail is then sent using a store-and-forward technique, requiring neither the sender nor the recipients to be online. Particularly, the client of the sender transmits the e-mail to the e-mail server thereof, which forwards the e-mail to corresponding e-mails servers of the recipients. Each recipient may then access the e-mail on a client thereof (either locally by downloading the e-mail with an e-mail client application or remotely on the e-mail server with a webmail application).

The e-mails allow communicating anywhere in the world, thereby conveying information in a direct and immediate way (either for personal or business purposes). Moreover, the simplicity of use of the e-mails has led to their proliferation. Particularly, it is very easy so send an e-mail to a large number of recipients. This is further facilitated by managing distribution lists, each containing multiple e-mail addresses of corresponding users; thereby, the e-mail may be sent automatically to all the users of a distribution list by simply specifying it as recipient thereof. All of the above is especially true in business settings; for example, an e-mail relating to a project is commonly sent to all the persons involved in it in some way (such as for technical, financial, and management reasons).

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

An embodiment provides a method for exchanging messages under the control of a messaging client. The method comprises splitting a content of a source message into a plurality of fragments defined by corresponding portions of its content associated with different recipients of the message. A plurality of transport messages are generated, each comprising one or more of the fragments associated with the recipients. The transport messages are submitted to a messaging server for causing it to provide the transport messages to corresponding further messaging clients of the recipients for their aggregation.

A further aspect provides a computer program for implementing the method.

A further aspect provides a corresponding computer program product.

A further aspect provides a system for implementing the method.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation).

Particularly.

DETAILED DESCRIPTION

It is often desirable to send an e-mail with a personalized content to different recipients thereof, for example when the e-mail contains confidential information that should be made available only to selected recipients (such as on security clearance or need-to-known bases). For this purpose, the sender may create multiple e-mails with different contents for the corresponding recipients. However, this technique may be annoying and ineffective for the sender; for example, the e-mails may generate separate threads (each grouping an e-mail with its replies), thereby making very difficult to manage an overall discussion relating to all the e-mails. Moreover, this is deleterious for the performance of the communication network.

On the other hand, generally each recipient receives a high number of e-mails being interested only in a small part of their contents. As a result, the recipient is overwhelmed with information; this generates confusion and makes it difficult for the user to focus on what it is actually of interest to him/her.

Alternatively, the sender may associate specific portions of the content of an e-mail with different recipients: corresponding e-mails are generated for the different portions of the content, which e-mails are then sent to the corresponding recipients. The same result may also be achieved by submitting the e-mail only once to the e-mail server together with instructions for its splitting; the e-mail server then generates the different e-mails for the recipients according to the control file and then sends them thereto. Moreover, the client may send a common chunk (for all the recipients) and corresponding e-mails addressed individually to each recipient (containing a pointer to the common chunk) to the e-mail server, which inserts the common chunk into the individual e-mails, thereby creating the complete e-mails to be sent to their recipients.

However, the above-mentioned techniques may involve a proliferation of e-mails, with a corresponding increase of traffic over the communication network that may impair its performance. This also prevents scaling to a very high number of recipients associated with different portions of the e-mails. Moreover, when the different e-mails are generated on the e-mail server, this requires a modification of the corresponding protocol; the operation is complex and slow (since it requires acceptance by international standard organizations).

Accordingly, some embodiments of the disclosure may transmit fragments associated with the same recipients together from the client. With reference in particular to FIG. 1A-FIG. 1F, an example application is shown of the solution according to some embodiments of the present disclosure.

Figure 1A:
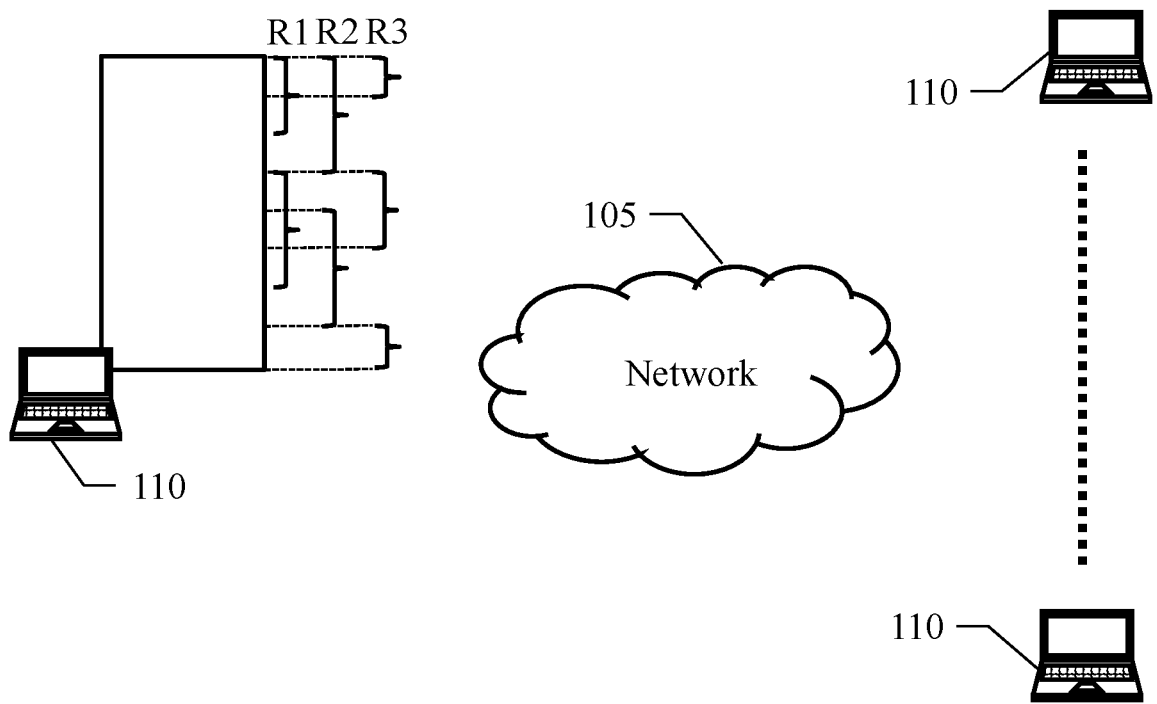
FIG. 1A-FIG. 1F show an example application of the solution according to an embodiment of the present disclosure.

Starting from FIG. 1A, (digital) messages may be exchanged over a communication network 105 among users (for example, persons) having corresponding client computing systems, or simply clients 110. Particularly, the messages may be e-mails (i.e., messages transmitted among the users identified by corresponding e-mail addresses using the SMTP protocol). For this purpose, a first user (referred to as sender) may create a (source) e-mail on his/her client 110, for example, via an e-mail client application running locally thereon. The source e-mail has a content, which may define the information to be conveyed. Particularly, the content of the source e-mail may be formed by a body (textual subject-matter with possible non-textual objects embedded therein) and possible attachments (external files). The source e-mail may be addresses to a plurality of other users (referred to as recipients). The recipients may be associated with corresponding (content) segments, which are at least in part different; each segment may be defined by a corresponding piece of the content of the source e-mail (e.g., either its whole content or a portion thereof), such as comprising one or more paragraphs of the body and/or one or more attachments. The segments may define what is to be sent to the corresponding recipients (with the recipients that are not to receive the possible rest of the content of the e-mail), for example, in case of confidential information that may be made available only to selected recipients, personalized information for selected recipients and so on. For example, the figure shows a source e-mail that is addressed to three recipients Ri (i=1 . . . 3). The recipient R1 is associated with two portions of the content of the source e-mail, the recipient R2 is associated with two portions of the content of the source e-mail, and the recipient R3 is associated with three portions of the content of the source e-mail (indicated by corresponding brackets in the figure). For example, the source e-mail has a body containing four paragraphs for a project description, a technical summary, technical details and a project financing, and four attachments being a project scope presentation, a project activity plan, a technical data report and a cost table. The source e-mail in FIG. 1A is addressed to a project manager (R1), a technical lead (R2), and a financial lead (R3). The segment defined by the project description, the technical summary, the project financing, the project scope presentation and the project activity plan may be associated with the project manager, the segment defined by the project description, the technical summary, the technical details, the project scope presentation, the project activity plan and the technical data report is associated with the technical lead, and the segment defined by the project description, the project financing, the project scope presentation and the cost table is associated with the financial lead.

Figure 1B:
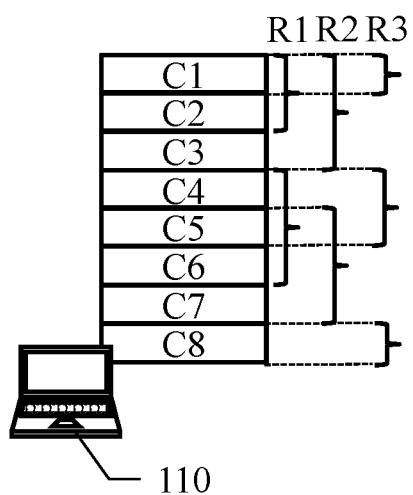

Moving to FIG. 1B, in the solution according to an embodiment of the present disclosure, the e-mail client (running on the client 110 in this case) may split the content of the source e-mail into a plurality of (content) fragments. The fragments may be defined by corresponding portions of the content of the source e-mail that are associated with different recipients. Therefore, in the example at issue, the content of the source e-mail is split into eight fragments Ci (i=1 . . . 8), with the fragment C1 associated with the recipients R1, R2, and R3; the fragment C2 associated with the recipients R1 and R2; the fragment C3 associated with the recipient R2; the fragment C4 associated with the recipients R1 and R3; the fragment C5 associated with the recipients R1, R2, and R3; the fragment C6 associated with the recipients R1 and R2; the fragment C7 associated with the recipient R2; and the fragment C8 associated with the recipient R3.

Figure 1C:
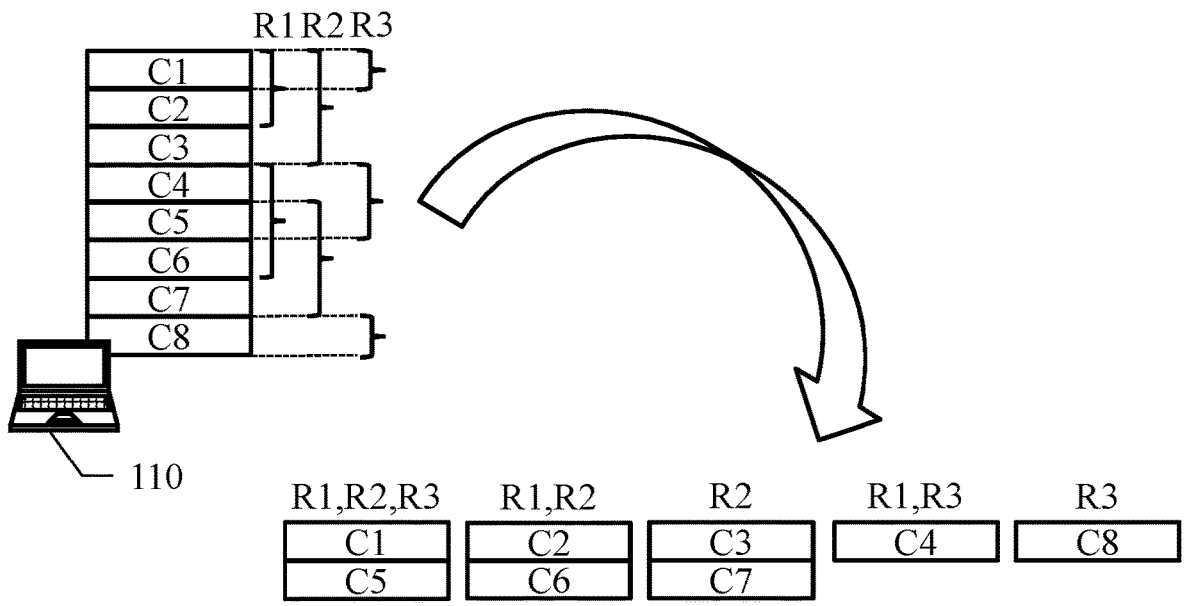

Moving to FIG. 1C, in a specific implementation, the e-mail client (running on the client 110 in this case) may group the fragments according to their recipients. Particularly, the fragments associated with the same (one or more) recipients may be put together. Therefore, in the example at issue, five groups are defined by the fragments C1 and C5 for the recipients R1, R2, and R3; by the fragments C2 and C6 for the recipients R1 and R2; by the fragments C3 and C7 for the recipient R2; by the fragment C4 for the recipients R1 and R3; and by the fragment C8 for the recipient R3.

Figure 1D:
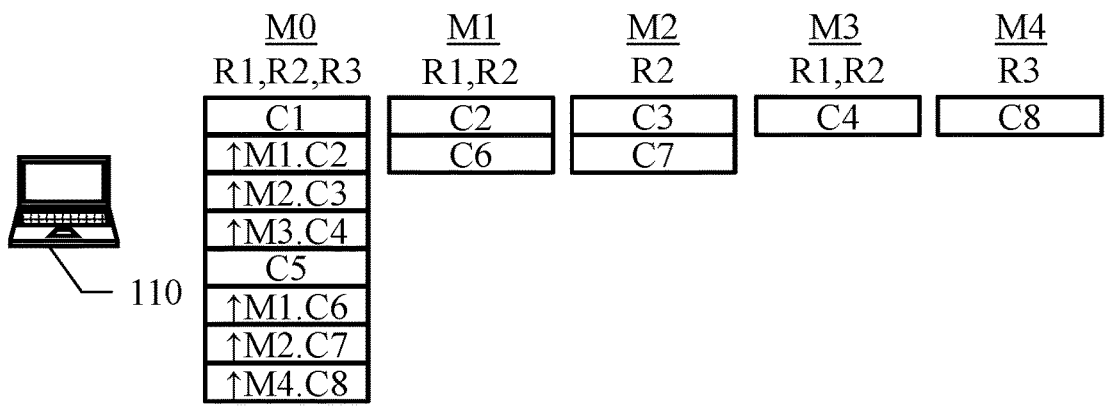

Moving to FIG. 1D, the e-mail client (running on the client 110 in this case) may generate a plurality of (transport) e-mails according to the fragments; particularly, in the implementation in FIG. 1D, a transport e-mail may be generated for each group of fragments. Moreover, the transport e-mails may contain aggregation information to be used for aggregating their contents according to the corresponding recipients. Particularly, in a specific implementation, a transport e-mail, referred to as main (transport) email, may be addressed to all the recipients. The main e-mail may have a content comprising one or more (common) fragments that are common to all the recipients (down to an empty one) and corresponding placeholders in place of the (non-common) fragments of the other transport e-mails, referred to as secondary (transport) e-mails. Therefore, in this example, five transport e-mails M0 (main), M1, M2, M3, and M4 (secondary) are generated. The main e-mail M0 may be addressed to all the recipients R1, R2 and R3; the content of the main e-mail M0 may comprise the fragment C1, the placeholder ↑M1.C2 for the fragment C2 of the secondary e-mail M1, the placeholder ↑M2.C3 for the fragment C3 of the secondary e-mail M2, the placeholder ↑M3.C4 for the fragment C4 of the secondary e-mail M3, the fragment C5, the placeholder ↑M1.C6 for the fragment C1 of the secondary e-mail M1, the placeholder ↑M3.C7 for the fragment C7 of the secondary e-mail M3, and the placeholder ↑M4.C8 for the fragment C8 of the secondary e-mail M4. The secondary e-mail M1 may comprise the fragments C2, C6 and it may be addressed to their recipients R1 and R2. The secondary e-mail M2 may comprise the fragments C3, C7 and it may be addressed to their recipient R2, the secondary e-mail M3 may comprise the fragment C4 and it may be addressed to its recipients R1 and R2, and the secondary e-mail M4 may comprise the fragment C8 and it may be addressed to its recipient R3.

Figure 1E:
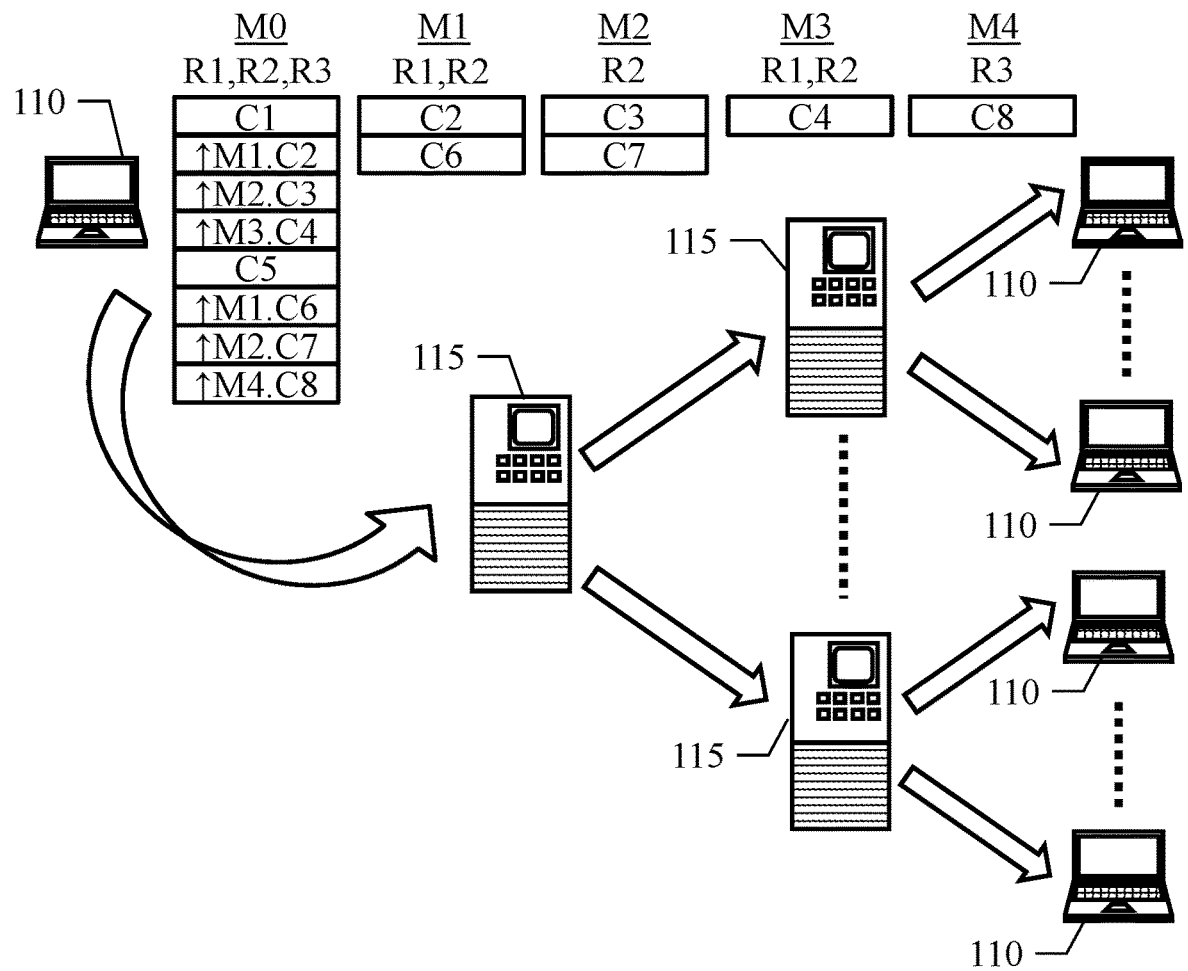

Moving to FIG. 1E, the (main/secondary) transport e-mails may be sent to their recipients via corresponding e-mail server computing systems, or simply e-mail servers 115 (e.g., with a store-and-forward technique). In some embodiments, the e-mail client (running on the client 110 in this case) may transmit the transport e-mails to the e-mail server 115 of the sender. The e-mail server 115 of the sender may forward each transport e-mail to the e-mail server 115 of each recipient thereof (when different from the one of the sender). Each recipient may then receive the transport e-mails addressed thereto with his/her client 110, for example, by downloading them from the corresponding e-mail server 115 via an e-mail client application running locally thereon.

Figure 1F:
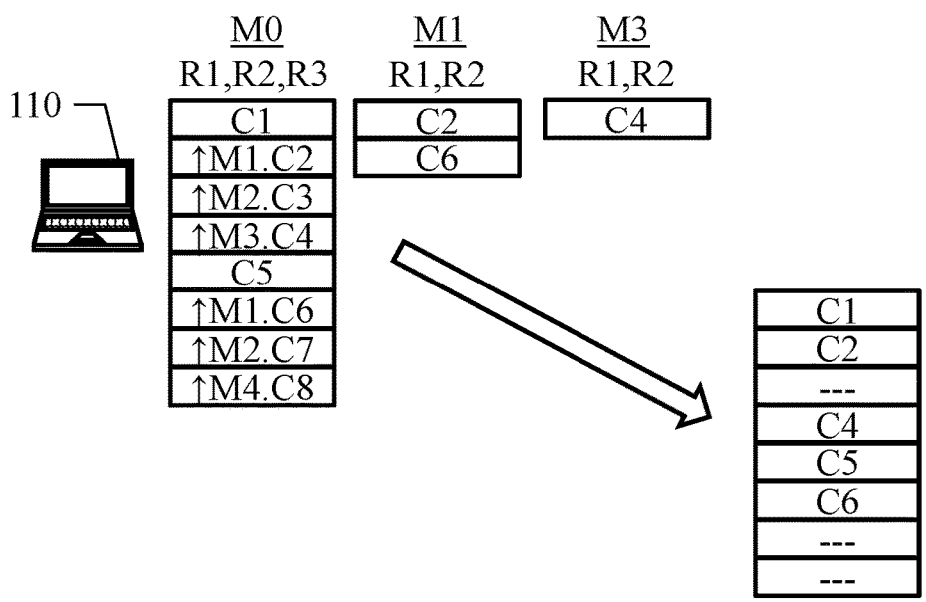

Moving to FIG. 1F, the e-mail client of each recipient (running on the corresponding client 110 in this case) may generate a (target) mail from the transport e-mails that have been received; the target e-mail may have a content that is obtained by aggregating the contents of the transport e-mails according to the aggregation information. In the above-mentioned specific implementation, the content of the target e-mail is obtained by inserting the fragments of the secondary e-mails into the content of the main e-mail in place of the corresponding placeholders. Therefore, considering the recipient R1 in the example shown in the figure, s/he receives the main e-mail MO and the secondary e-mails M1 and M3. Therefore, in the target e-mail the fragment C2 of the secondary e-mail M1 replaces the placeholder ↑M1.C2, the fragment C4 of the secondary e-mail M3 replaces the placeholder ↑M3.C4, and the fragment C6 of the secondary e-mail M1 replaces the placeholder ↑M1.C6. As a result, the content of the target e-mail is only formed by the segment of the content of the source e-mail actually to be sent to the recipient R1 (i.e., its portions formed by fragments C1-C2 and C4-C6, with a possible indication of the rest of the content of the source e-mail that has been omitted, represented by dashes in the figure). The target e-mail is then output on the client 110 as usual (for example, by displaying its body and/or opening its attachments).

One feature and advantage of the above-described embodiment is that it may allow sending a single e-mail to multiple recipients with different pieces of its content; therefore, personalized e-mails may be sent in a simple and fast way (maintaining all the corresponding replies into a single thread facilitating a management of a corresponding discussion).

This result may be achieved in a very effective way because each portion of the content of the source e-mail may be transmitted from the client of the sender to the corresponding e-mail server only once. This may reduce a corresponding traffic over the communication network, with a beneficial impact on its performance. The same embodiment is then well-suited to scale even to a very high number of recipients (associated with different pieces of the content of the source e-mail).

Moreover, in some embodiments, all the operations involved in splitting the content of the source e-mail (and to aggregate the contents of the transport e-mails) may be performed by the e-mail clients, whereas the transport e-mails are sent as usual. Therefore, the above-described embodiment does not require any modification of the e-mail servers, so that it is of direct application.

Figure 2:
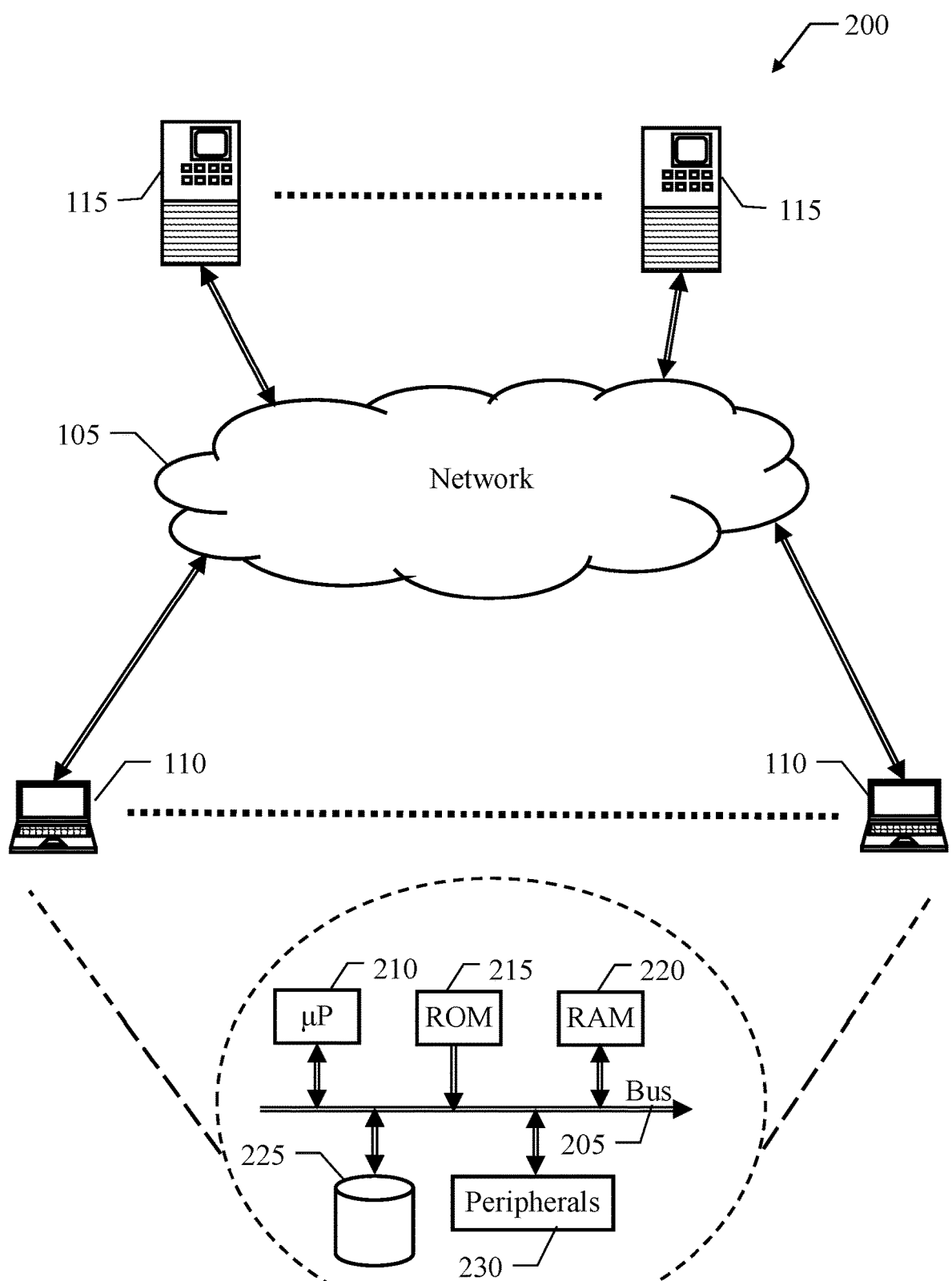
FIG. 2 shows a schematic block diagram of an information technology infrastructure that may be used to implement the solution according to an embodiment of the present disclosure.

With reference now to FIG. 2, a schematic block diagram is shown of an information technology infrastructure 200 that may be used to implement the solution according to an embodiment of the present disclosure.

The (information technology) infrastructure 200 may comprise the communication network 105 (for example, based on the Internet), which may be accessed by the clients 110 and e-mail servers 115 to communicate among them.

Each of the above-described computing systems (i.e., clients 110 and e-mail servers 115) may comprise several units that are connected among them through a bus structure 205 at one or more levels (with an architecture that is suitably scaled according to the type of the computing system 110, 115). Particularly, a microprocessor (μP) 210, or more, may provide a logic capability of the computing system 110, 115; a non-volatile memory (ROM) 215 may store basic code for a bootstrap of the computing system 110, 115 and a volatile memory (RAM) 220 may be used as a working memory by the microprocessor 210. The computing system 110, 115 may be provided with a mass-memory 225 for storing programs and data (for example, an SSD for each client 110 and storage devices of a data center wherein each e-mail server 100 is implemented). Moreover, the computing system 110, 115 may comprise a number of controllers for peripherals, or Input/Output (I/O) units, 230; for example, the peripherals 230 of each client 110 may comprise a monitor for displaying information, a keyboard and a mouse for entering data/commands, a network adapter (NIC) for connecting to the communication network 105, and a drive for reading/writing removable storage units (such as of USB type). The peripherals 230 of each e-mail server 115 may comprise a network adapter for plugging the e-mail server 115 into the corresponding data center (and then connecting it to a switch/router sub-system of the data center for its access to the communication network 105).

Figure 3:
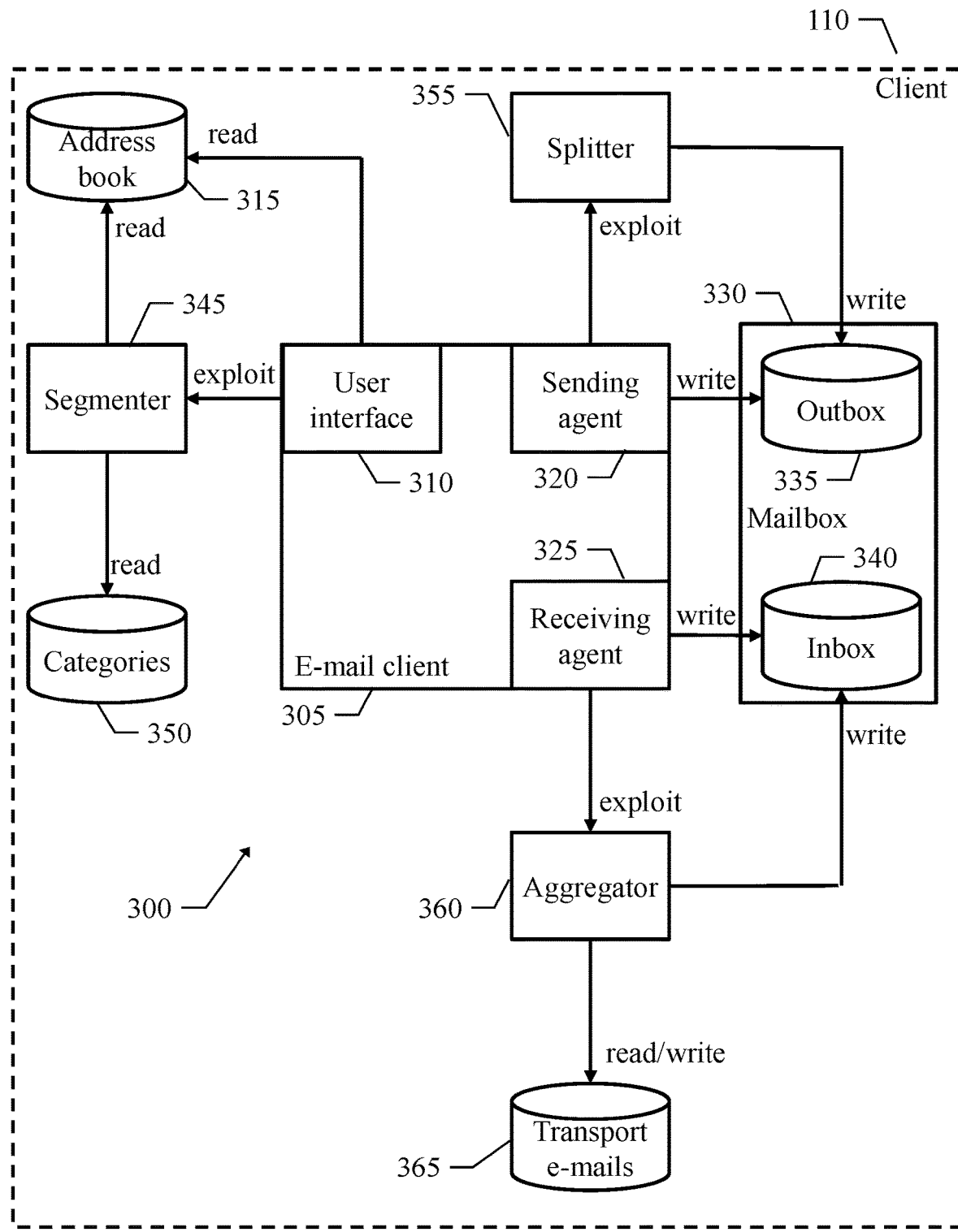
FIG. 3 shows example software components that may be used to implement the solution according to an embodiment of the present disclosure.

With reference now to FIG. 3, example software components are shown that may be used to implement the solution according to an embodiment of the present disclosure.

In FIG. 3, all the software components (programs and data) are denoted as a whole with the reference 300. The software components may be stored in the mass memory and loaded (at least partially) into the corresponding computing system when the programs are running, together with an operating system and other application programs not directly relevant to the solution of the present disclosure (thus omitted in the figure for the sake of simplicity). When a first user manages the e-mails locally, the computing system is his/her client 110. The programs may be initially installed into the mass memory, for example, from removable storage units or from the communication network. In this respect, each program may be a module, segment or portion of code, which comprises one or more executable instructions for implementing the specified logical function.

An e-mail client 305 may be used to manage the e-mails of the user of the client 110 locally. The e-mail client 305 may be adapted for composing and sending (outgoing) e-mails to other users, and it may allow receiving (ingoing)

e-mails from other users via the corresponding e-mail server (not shown in the figure). For this purpose, the e-mail client 305 may expose a user interface 310 for managing the e-mails by the user; particularly, the user interface 310 may be used to compose the e-mails to be sent as usual (by editing their bodies, adding attachments, selecting their recipients, either individually or via distribution lists, and so on), to display the e-mails being sent and received, to archive/delete them and so on. The user interface 310 may read an address book 315. The address books 315 may contain information about known other users (referred to as contacts). For example, the address book 315 may comprise an entry for each contact; the entry may store a nickname of the user and the corresponding e-mail address (in addition to possible additional information about him/her). The address book 315 may also contain one or more further entries for distribution lists; in this case, the entry stores a nickname of the distribution list and a group of e-mail addresses of corresponding users. Moreover, the e-mail client 305 may comprise a sending agent 320 adapted to send the e-mails and a receiving agent 325 adapted to receive the e-mails (both of them communicating with the e-mail server of the user). Both the sending agent 320 and the receiving agent 325 may write a mailbox repository 330, which may comprise an outbox 335 storing the e-mails that have been sent and an inbox 340 storing the e-mails that have been received; particularly, the sending agent 320 may write the outbox 335 and the receiving agent 325 writes the inbox 340.

The user interface 310 may be communicatively coupled to a segmenter 345. The segmenter 345 may extend the user interface 310 with the possibility of associating the recipients of each (source) e-mail to be sent with corresponding segments of its content. For example, the segmenter 345 may allow selecting a segment as a portion of the body of the source e-mail and/or as one or more attachments of the source e-mail; the segmenter 345 may then allow selecting one or more of the recipients of the source e-mail to be associated with the segment. In a specific embodiment of the present disclosure, the segmenter 345 reads a (recipient) category repository 350. The category repository 350 lists one or more categories of recipients to be used for segmenting the e-mails. For example, the categories indicate roles (such as technical lead, financial lead, project manager and the like), authorizations (such as for unclassified, confidential, secret, top-secret and the like information), permissions (such as need-to-know, allowed/forbidden and the like) and so on. In this case, the segmenter 345 further allows selecting one or more of the categories to be associated with each segment of the source e-mail as above. The segmenter 345 then reads the address book 315 as well. In this case, each entry of the address book 315 (for either a contact or a distribution list) may also contain the indication of one or more of the categories to which the corresponding users belong.

In the solution according to an embodiment of the present disclosure, the sending agent 315 may be communicatively coupled to a splitter 355. The splitter 355 may extend the sending agent 315 for sending the (source) e-mails whose contents have been segmented. In some embodiments, the splitter 355 may split the content of each source e-mail into its fragments, generate the corresponding transport e-mails and transmit them to the e-mail server in place of the source e-mail, but saving the source e-mail (and not the transport e-mails) into the outbox 335 as usual. For this purpose, the splitter 355 may write to the outbox 335. Moreover, the receiving agent 325 may comprise an aggregator 360. The aggregator 360 may extend the receiving agent 325 for receiving the (transport) e-mails that originate from the splitting of corresponding source e-mails. Particularly, the aggregator 360 may aggregate the contents of the secondary e-mails into the contents of the corresponding main e-mails, and then save the (target) e-mails so obtained into the inbox 340 as usual (instead of the transport e-mails). For this purpose, the aggregator 360 may write the inbox 340 and may read/write a transport e-mail repository 365. The transport e-mail repository 365 may store the transport e-mails being received that are still to be aggregated into the corresponding target e-mails.

Figure 4A:
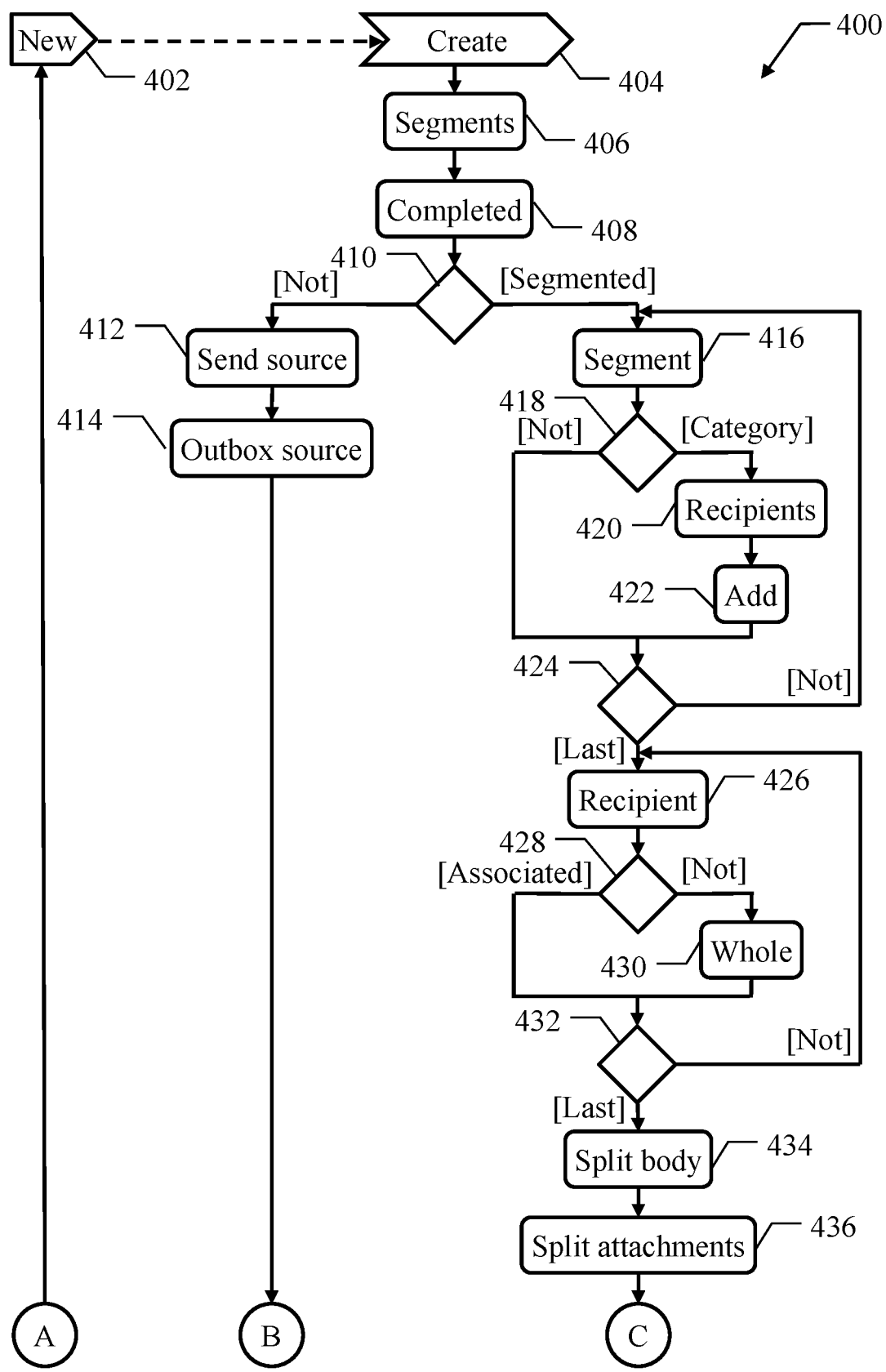
FIG. 4A-FIG. 4C show an activity diagram describing the flow of activities relating to an implementation of the solution according to an embodiment of the present disclosure.
Figure 4B:
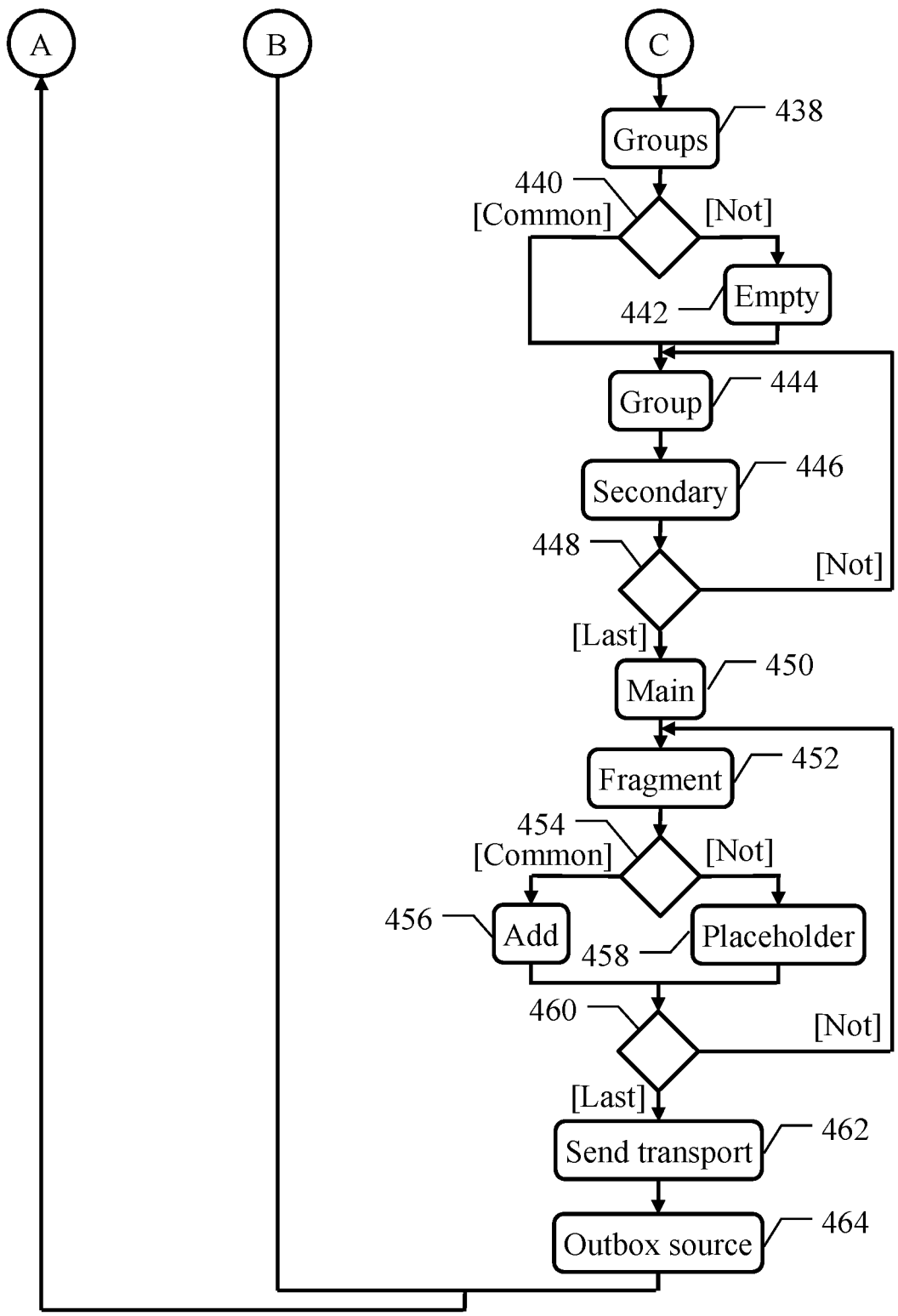
Figure 4C:
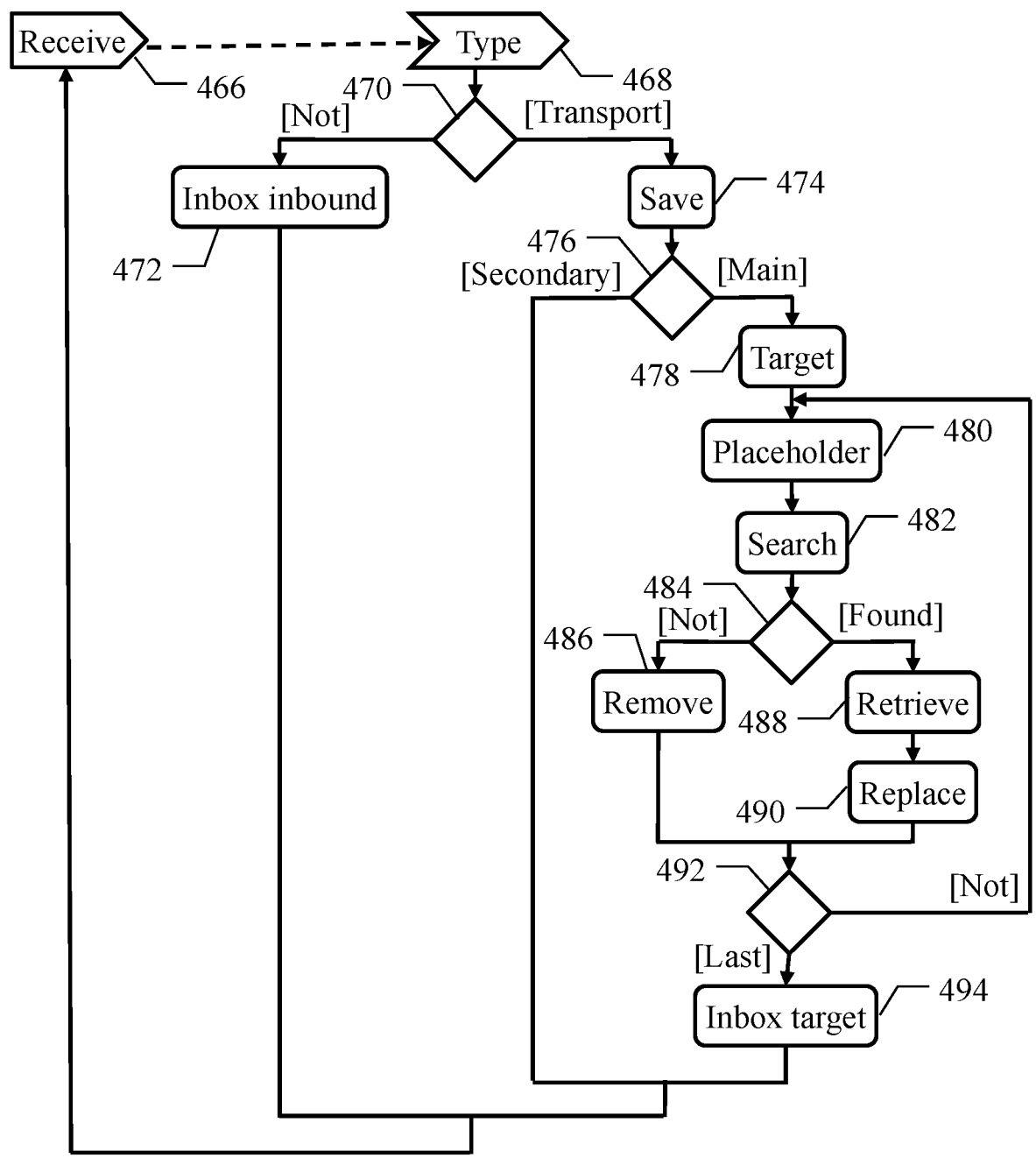

With reference now to FIG. 4A-FIG. 4C, an activity diagram is shown describing the flow of activities according to an embodiment of the present disclosure.

Particularly, the diagram represents an example process that may be used to exchange (send/receive) e-mails with a method 400. In this respect, each block may correspond to one or more executable instructions for implementing the specified logical function by the e-mail client of a generic user (on the corresponding client when it runs locally thereon).

The process passes from block 402 to block 404 whenever the user (operating as a sender) wishes to send a new (source) e-mail. For this purpose, the user may create the source e-mail from scratch or by forwarding/replying to a previous e-mail that has been received from another user (by selecting corresponding commands provided by the user interface of the e-mail client). In any case, the user interface may open a composing window for allowing the user to compose the source e-mail. The composing window may allow the user to perform one or more of the following operations once or more times in any order. Particularly, the user may: enter a subject, may enter a body by typing a textual subject-matter and embedding one or more non-textual objects, and may add one or more attachments (from a content being empty when the source e-mail is created from scratch or comprising the content of the previous e-mail when the source e-mail is created by forwarding/replying to it, in both cases with the possible addition of a pre-defined signature of the user). In any case, the user may specify one or more recipients of the source e-mail, such as primarily ("to"), in carbon-copy ("cc") or in blind carbon-copy ("bcc"). For example, the recipients may be specified by entering their e-mail addresses manually and/or by selecting one or more contacts/distribution lists from the address book (in the latter case, with the user interface that automatically adds the e-mail addresses of each distribution list). According to some embodiments of the present disclosure, if the user wishes to send personalized versions of the source e-mail with different pieces of its content to the recipients, at block 406, the user may associate different segments of the content to the recipients (operation being performed either once the content of the source e-mail has been completed or during its composition). For this purpose, the user may select a segment as a piece of the body of the source e-mail, up to the whole of it (for example, by dragging the mouse over it) and/or as one or more attachments of the source e-mail (for example, by clicking over them while holding a corresponding modifier key of the keyboard); in any case, the user may associate the segment with one or more of the recipients of the source e-mail and/or with one or more of the pre-defined categories retrieved from the corresponding repository (for example, with a contextual menu being opened by right-clicking with the mouse).

Once the composition of the source e-mail has been completed, the user at block 408 may select a command for sending the source e-mail. In response thereto, the e-mail client may create the corresponding source e-mail. Typically, any e-mail may comprise a body that contains its textual subject-matter and a header (containing information for handling the e-mail); particularly, the header may contain a number of fields either standard with predefined meaning or optional for custom use, each in the form of a name/value pair (separate by the character ":"); particularly, (standard) fields may be used to indicate the subject, possible non-textual objects to be embedded in the body and possible attachments in the form of external files to be added. The flow of activity then branches at block 410 according to a type of the source e-mail. If the content of the source e-mail has not been segmented (i.e., no segment has been selected), the sending agent of the e-mail client at block 412 may send the source e-mail as usual by submitting it to the corresponding e-mail server. The sending agent at block 414 then may save the source e-mail being sent into the outbox of the mailbox repository. The process may now return to the block 402 waiting for the creation of a further source e-mail to be sent.

Referring back to the block 410, if the content of the source e-mail has instead been segmented (e.g., one or more segments have been selected for corresponding recipients), the segmenter may complete the segmentation of the content of the source e-mail (if necessary). For this purpose, a loop may be entered at block 416 wherein the segmenter takes a (current) segment into account (starting from a first one in any arbitrary order). The flow of activity may then branch at block 418 according to how the recipients have been associated with the segment. If the segment is associated with one or more categories, the segmenter at block 420 may determine the recipients belonging to these categories (as indicated in the address book). The segmenter at block 422 may further associate the segment with the recipients so determined in place of their categories (in addition to possible other recipients associated with the segment explicitly). The process may then descend into block 424; the same point is also reached directly from the block 418 when the segment is not associated with any category. The segmenter may now verify whether a last segment has been processed. If not, the process may return to the block 416 to repeat the same operations for a next segment. Conversely (once all the segments have been processed) the loop may exit by descending into block 426. In this way, the segments may be associated with the recipients automatically according to properties thereof (as defined by their belonging to the different categories); this facilitates the segmentation of the content of the source e-mail, especially in case of a very high number of recipients. A further loop may now be entered wherein the segmenter may take a (current) recipient into account (starting from a first one in any arbitrary order). The segmenter at block 428 may determine the possible segments associated with the recipient. If no segment is associated with the recipient, the segmenter at block 430 may associate the recipient with a segment defined by the whole content of the source e-mail (body and attachments). The process then continues to block 432; the same point is also reached directly from the block 428 when the recipient is already associated with one or more segments. The segmenter now verifies whether a last recipient has been processed. If not, the process returns to the block 426 to repeat the same operations for a next recipient. Conversely (once all the recipients have been processed) the loop may exit by descending into block 434. This may facilitate the segmentation of the content of the source e-mail as well, especially in case portions of the content of the source e-mail have to be removed only for a few of the recipients.

The splitter may now split the content of the source e-mail into the fragments corresponding to its segmentation. For this purpose, the splitter may scan the body of the source e-mail beginning from its start. As soon as a segment is encountered, the splitter may create a new fragment spanning from the end of the previous fragment (initialized to the start of the whole body) to this point; the same operation may be repeated until the end of the body has been reached (with the creation of a further fragment spanning from the end of the previous fragment to the end of the body). Continuing to block 436, the splitter may create a fragment for each attachment of the source e-mail. The splitter at block 438 may group the fragments, by putting together the ones associated with the same recipients. The splitter at block 440 may verify whether a group of (common) fragments exists that is associated with all the recipients. If not, the splitter at block 442 may create a further group with a (common) fragment that is empty. The process may then descend into block 444; the same point may also be reached directly from the block 440 when the group of common fragments already exists.

At this point, the splitter may generate the secondary (transport) e-mails corresponding to the source e-mail. For this purpose, a loop may be entered for scanning the groups of (non-common) fragments different from the group of common fragments of the source e-mail. The loop beginning with the splitter that may take a (current) group of non-common fragments into account (starting from a first one in an arbitrary order). The splitter at block 446 may generate a (new) secondary e-mail that has the content equal to the group of non-common fragments and that it may be addressed to the recipients associated therewith. Moreover, the secondary e-mail may contain a (secondary) indicator indicative of its nature of secondary e-mail and corresponding (fragment) indicators of its non-common fragments. Particularly, the secondary indicator and the fragment indicators may be provided by corresponding optional fields that are added to the header of the secondary e-mail; each fragment indicator may have a value that identifies the corresponding fragment by a (unique) name and by a definition thereof (for example, its start and end in the body of the secondary e-mail for a paragraph or a file name for an attachment). The splitter at block 448 may verify whether a last group of non-common fragments has been processed. If not, the process returns to the block 444 to repeat the same operations for a next group of non-common fragments. Conversely (once all the groups of non-common fragments have been processed) the loop may exit descending into block 450. At this point, the splitter may generate the main (transport) e-mail corresponding to the source e-mail. Particularly, the main e-mail may be initialized to have the same subject of the source e-mail, an empty content, and to be addressed to all the recipients of the source e-mail; moreover, the main e-mail may contain a (main) indicator indicative of its nature of main e-mail, as above provided by a corresponding optional field that is added to the header of the main e-mail. A loop may then be performed for populating the content of the main e-mail. The loop begins at block 452, wherein the splitter may take a (current) fragment of the source e-mail into account (starting from a first one along its content). The splitter at block 454 may verify whether the fragment is common to all the recipients (e.g., it belongs to the corresponding group). If so, the splitter at block 456 may add the (common) fragment to the content of the main e-mail (at the same position as in the content of the source e-mail). Conversely, the splitter at block 458 may add a placeholder for the (non-common) fragment to the content of the main e-mail (in place of the non-common fragment at the same position thereof as in the content of the source e-mail). The placeholder may identify the non-common fragment in the corresponding secondary e-mail. For example, the placeholder may be formed by two name/value pairs (such as separated by the character ":") that identify the secondary e-mail (such as by the value of the "Message-ID" field contained in the header of the secondary e-mail) and the non-common fragment within the secondary e-mail (such as by the name of the non-common fragment used to identify it in the corresponding field of the secondary e-mail). The flow of activity merges again at block 460 from either the block 456 or the block 458. At this point, the splitter may verify whether a last fragment has been processed. If not, the process may return to the block 452 to repeat the same operations for a next fragment. Conversely (once all the fragments have been processed) the loop may exit by descending into block 462. At this point, the splitter may send the (main/secondary) transport e-mails as usual by submitting them to the corresponding e-mail server; particularly, the splitter may send the secondary e-mails first and the main e-mail later on, to ensure that they are received in the same order by each recipient. However, the splitter at block 464 may now save the source e-mail (and not the transport e-mails) into the outbox in the mailbox repository. The process may then return to the block 402 waiting for the creation of a further source e-mail to be sent.

In a completely independent way, the process may pass from block 466 to block 468 whenever the receiving agent of the e-mail client receives a new (inbound) e-mail. In response thereto, the aggregator may verify the type of the inbound e-mail by searching the field representing the main/secondary indicator in its header. The flow of activity may branch at block 470 according to a result of this verification. If neither the main indicator nor the secondary indicator has been found (meaning that the inbound e-mail is not a transport e-mail), the e-mail client at block 472 may save the inbound e-mail into the inbox of the mailbox repository as usual. The process may then return to the block 466 waiting for the receipt of a further inbound e-mail.

Referring back to the block 470, if the main indicator or the secondary indicator has been found (meaning that the inbound e-mail is a transport e-mail), the aggregator at block 474 may save it into the transport e-mail repository. The flow of activity may further branch at block 476 according to the type of the transport e-mail as defined by the main/secondary indicator. If the transport e-mail contains the secondary indicator (meaning that it is a secondary e-mail), the process may directly return to the block 466 waiting for the receipt of a further e-mail. Conversely, if the transport e-mail contains the main indicator (meaning that it is a main e-mail), a target e-mail may be generated by aggregating the main e-mail with the corresponding secondary e-mails (with all the secondary e-mails, if any, that have been received before the main e-mail because of their sending order). For this purpose, the aggregator at block 478 may initialize the target e-mail to the main e-mail. A loop may then be entered at block 480, wherein the aggregator may take a (current) placeholder of the target e-mail into account (starting from a first one in any arbitrary order). The aggregator at block 482 may search the fragment identified by the placeholder in the secondary e-mails contained in the transport e-mail repository. Particularly, the aggregator may extract the name of the fragment from the placeholder and may then verify whether any secondary e-mail exits containing a fragment indicator with the value equal to the name of the fragment. The flow of activity may branch at block 484 according to a result of this search. If no secondary e-mail containing the fragment has been found, the aggregator at block 486 may remove the placeholder from the content of the target e-mail (possibly replacing it with an indication of its omission, such as an ellipses). Conversely, if a secondary e-mail containing the fragment has been found, the aggregator at block 488 may retrieve the fragment from it. Particularly, the aggregator may retrieve the definition of the fragment from the fragment indicator and then may retrieve the fragment from the content of the secondary e-mail accordingly; for example, this may involve extracting a portion of the body of the secondary e-mail comprised between the corresponding start and end, or extracting the attachment having the corresponding file name from the secondary e-mail. The aggregator at block 490 may replace the placeholder with the fragment so obtained into the target e-mail. The flow of activity may merge again at block 492 from the block 486 or the block 490, wherein the aggregator verifies whether a last placeholder has been processed. If not, the process may return to the block 480 to repeat the same operations for a next placeholder. Conversely (once all the placeholders have been processed) the loop is exited by descending into block 494. At this point, the aggregator may save the target e-mail so obtained into the inbox (at the same time removing the main e-mail and the possible secondary e-mails used to generate it from the transport e-mail repository). The process may then return to the block 466 waiting for the receipt of a further e-mail.

The (inbound/target) e-mail so saved into the inbox (either directly or obtained by aggregating the transport e-mails) may now be used as usual. For example, the user may open the e-mail (such as by double-clicking on it) to display its body and/or may open its attachments to display them (in both cases, on the monitor of the client), may print the body and/or the attachments, may replay to the e-mail, may forward the e-mail and so on. Particularly, in the case of the target e-mail, it may comprise all the recipients of the corresponding source e-mail (since generated from the corresponding main e-mail sent to all of them); therefore, the user may see all the recipients (except possible ones in blind carbon copy) and it may replay to all of them as usual (irrespective that some portions of the source e-mail may have been removed for him/her).

In order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for or any means-plus-function formulation (and only such specific formulations) should be intended as any structure adapted or configured for carrying out the relevant function.

For example, an embodiment provides a method for exchanging messages. However, the messages may be of any type (for example, e-mails, instant messages and so on).

In an embodiment, the messages may be exchanged over a communication network. However, the communication network may be of any type (for example, a global, local or wide area network, exploiting any type of wired and/or wireless connections, such as of metal wire, optical fiber, Wi-fi, mobile telephone or satellite type, and so on).

In an embodiment, the method may comprise the following operations under the control of a messaging client. However, the messaging client may be of any type (for example, an e-mail client application, a web-mail application, a chat application and so on) and it may run on any computing system (for example, locally on a client computing system of a user, remotely on a corresponding server computing system and so on).

In an embodiment, the method may comprise creating (by the messaging client) a source message. However, the source message may be created in any way (for example, from scratch, by replying to another message, by forwarding another message and so on).

In an embodiment, the source message may have a content. However, the content may be of any type (for example, a body, one or more attachments, a subject, in the form of text, images, videos, audios, files and so on).

In an embodiment, the source message may be addressed to a plurality of recipients. However, the recipients may be in any number and of any type (for example, indicated explicitly, by distribution lists, inserted manually and/or automatically, such as when replaying to another e-mail, identified by e-mail addresses, userIDs, telephone numbers and so on).

In an embodiment, the recipients may be associated with corresponding segments being at least in part different. However, the recipients may be associated with the segments in any way (for example, explicitly, using categories or rules, by defining each segment and associating it with one or more recipients, by selecting each recipient and defining the corresponding segment, after completing the source message or during its creation, and so on).

In an embodiment, each of the segments may be defined by at least a portion of the content of the source message. However, each segment may be of any type (for example, a portion of the content or the whole content, one or more paragraphs, either contiguous or separate, one or more attachments, and so on).

In an embodiment, the method may comprise splitting (by the messaging client) the content of the source message into a plurality of fragments defined by corresponding portions of the content of the source message associated with different ones of the recipients. However, the fragments may be in any number and defined in any way (for example, by scanning the body for identifying its portions associated with different recipients, by defining a fragment for each attachment or for each group of attachments associated with the same recipients, and so on).

In an embodiment, the method may comprise generating (by the messaging client) a plurality of transport messages each having a content comprising one or more of the fragments associated with same one or more of the recipients and being addressed thereto. However, the transport messages may be in any number and generated in any way (for example, a transport message of each group of fragments associated with the same recipients, a transport message for each fragment and so on).

In an embodiment, the transport messages may contain corresponding aggregation information for aggregating the transport messages according to the corresponding recipients. However, the aggregation information may be of any type (for example, with a main transport message addressed to all the recipients containing placeholders for the non-common fragments and secondary transport messages containing indicators of the corresponding non-common fragments, with each transport message containing an indication of its belonging to the source message and information about a position of the corresponding fragments in the content of the source message, and so on).

In an embodiment, the method may comprise submitting, by the messaging client, the transport messages to a messaging server. However, the transport messages may be submitted to the messaging server in any way (for example, transmitted from the client computing system to the server computing system, passed from the messaging client to the messaging server, both of them running on the server computing system, with the attachments that are uploaded to the server computing system during the creation of the source message or at the submission of the transport messages, and so on).

In an embodiment, this may cause the messaging server to provide the transport messages to corresponding further messaging clients of the corresponding recipients for aggregation thereof according to the corresponding aggregation information. However, the further messaging clients may be of any type (either the same or different with respect to the messaging client) and the transport messages may be provided thereto in any way (for example, to corresponding further server computing systems directly or via one or more hops, with the transport messages that are left on the further server computing systems or downloaded to further client computing systems of the recipients for accessing them remotely or locally, respectively, via the further messaging clients, and so on).

Further embodiments provide additional advantageous features, which may however be omitted at all in a basic implementation.

Particularly, in an embodiment, the method may comprise grouping (by the messaging client) the fragments into a plurality of groups, each comprising one or more of the fragments associated with same one or more of the recipients. However, the groups may be created in any way (for example, indiscriminately, only for consecutive portions of the body, only for the attachments, and so on).

In an embodiment, the method may comprise generating (by the messaging client) the transport messages corresponding to the groups, each having the content comprising the fragments of the corresponding group. However, the transport messages may be generated in any way (for example, with each transport message containing a definition of its fragments, separation elements between each pair of fragments, and so on).

In an embodiment, the method may comprise generating (by the messaging client) a main one of the transport messages being addressed to all the recipients. However, the main transport message may be of any type (for example, with its content comprising the fragments common to all the recipients, being empty, and so on).

In an embodiment, the main transport message may contain the corresponding aggregation information comprising an indication of the fragments of secondary one or more of the transport messages being different from the main transport message. However, the aggregation information may indicate the fragments of the secondary transport messages in any way (for example, with each fragment indicated by a placeholder arranged at the position of the fragment in the source message, by a field indicating the position of the fragment in the source message, and so on).

In an embodiment, the method may comprise generating (by the messaging client) the main transport message having the content comprising common one or more of the fragments being common to all the recipients. However, the common fragments may be in any number (down to one being empty).

In an embodiment, the method may comprise generating (by the messaging client) the main transport message having the content comprising corresponding placeholders in place of the fragments of the secondary transport messages. However, the placeholders may be of any type (for example, in any format, with any syntax and so on).

In an embodiment, the method may comprise receiving (by the messaging client) a plurality of further transport messages having corresponding contents and containing corresponding further aggregation information for aggregating the further transport messages. However, the further transport messages may be received in any way (for example, with the further transport messages that are downloaded locally to the client computing system, are accessed remotely on the server computing system, and so on).

In an embodiment, the method may comprise generating (by the messaging client) a target message having a content obtained by aggregating the contents of the further transport messages according to the further aggregation information. However, the target message may be generated in any way (for example, by inserting fragments of secondary further transport messages into a main further transport message, by inserting the fragments of the further transport messages into an empty target message, and so on).

In an embodiment, the method may comprise outputting (by the messaging client) a representation of the target message. However, the target message may be output in any way (for example, displayed, printed, directly in complete form or initially in preview form, and so on).

In an embodiment, the method may comprise receiving (by the messaging client) the further transport messages comprising a main further transport message and one or more secondary further transport messages, the content of each of the secondary further transport message comprising one or more further fragments and the further aggregation information of the main further transport message comprising an indication of the further fragments of the secondary further transport messages. However, the further fragments may be indicated in any way (see above).

In an embodiment, the method may comprise generating (by the messaging client) the target message having the content obtained by inserting the further fragments of the secondary further transport messages into the content of the main further transport message according to the further aggregation information. However, the target message may be generated in any way (for example, with or without any indication of the removed further fragments, and so on).

In an embodiment, the method may comprise receiving (by the messaging client) the further main transport message with the content comprising corresponding further placeholders indicative of the further fragments of the further secondary transport messages. However, the further placeholders may be of any type (see above).

In an embodiment, the method may comprise generating (by the messaging client) the target message having the content obtained by inserting the further fragments of the further secondary transport messages into the content of the further main transport message in place of the corresponding further placeholders. However, the target message may be generated in any way (for example, by leaving the further placeholders being not replaced, by removing the further placeholders being not replaced, by adding any omission indicator in place of the further placeholders being not replaced, and so on).

In an embodiment, the method may comprise associating (by the messaging client) categorized one or more of the segments each with one or more selected categories of one or more pre-defined categories. However, the categories may be in any number and of any type (for example, partial, different, and additional categories with respect to the ones mentioned above).

In an embodiment, the method may comprise determining (by the messaging client) one or more of the recipients of the source message associated with each of the selected categories from an address book. However, the address book may be of any type (for example, the same of the contacts, a dedicated one for the categories and so on).

In an embodiment, the method may comprise associating (by the messaging client) each of the categorized segments with the recipients associated with the corresponding selected categories. However, the recipients may be associated with the categorized segments in any way (for example, by replacing its categories, by leaving their indication and so on).

In an embodiment, the source message and the transport messages may be corresponding e-mails. However, the e-mails may be of any type (for example, with the body that is either filled-in or empty, with or without attachments, and so on).

In an embodiment, the content of each of the e-mails may comprise a body, at least part of the segments and the fragments comprising corresponding pieces of the body. However, the body may be of any type (for example, only of textual type, containing non-textual objects and so on).

In an embodiment, the content of each of the e-mails may comprise one or more attachments, at least part of the segments and the fragments each comprising one or more of the attachments. However, the attachments may be of any type (for example, with or without size limits, with or without forbidden extensions, and so on).

Generally, similar considerations apply if the same solution is implemented with an equivalent method (by using similar operations with the same functions of more operations or portions thereof, removing some non-essential operations, or adding further optional operations); moreover, some operations may be performed in a different order, concurrently or in an interleaved way (at least in part).

An embodiment may provide a computer program that is configured for causing a computing system to perform the method described above when the computer program is executed on the computing system. An embodiment provides a computer program product that comprises one or more computer readable storage media having program instructions collectively stored in said one or more computer readable storage media, the program instructions readable by the computing system to cause the computing system to perform the same method. However, the program may be implemented as a stand-alone module, as a plug-in for a pre-existing program (for example, an e-mail client application or a web-mail application), or even directly in the latter; moreover, the program may take any form suitable to be used by any computing system (see below).

An embodiment may provide a system configured for performing the operations of the above-described method. An embodiment may provide a system comprising circuitry (i.e., any hardware suitably configured, for example, by software) for performing each operation of the same method. However, the system may be of any type (for example, a client computing system such as a desktop, a laptop, a tablet or a smartphone, a server computing system such as a mainframe, a virtual machine or a cloud service, and so on).

Generally, similar considerations apply if the system has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

Some embodiments of this disclosure may be a system, a method, and/or a computer program product at any possible technical detail level of integration. The computer program product may include a computer readable storage medium (or media) having computer readable program instructions thereon for causing a processor to carry out aspects of the present invention. The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as including transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in one or more of the computing/processing devices may receive computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general-purpose computer, special purpose computer, or other programmable data processing apparatus to produce a machine, such that the instructions, which execute via the processor of the computer or other programmable data processing apparatus, may implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions, which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which may comprise one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Therefore, it is desired that the embodiments described herein be considered in all respects as illustrative, not restrictive, and that reference be made to the appended claims for determining the scope of the invention.

What is claimed is:

1. A method for exchanging messages over a communication network, wherein the method comprises, under control of and by a messaging client:
   creating a source message having a content and being addressed to a plurality of recipients associated with corresponding segments being at least in part different, each of the segments being defined by at least a portion of the content of the source message;
   associating categorized one or more of the segments each with one or more selected categories of one or more pre-defined categories;
   determining one or more of the recipients of the source message associated with each of the selected categories from an address book;
   associating categorized one or more of the segments each with one or more selected categories of one or more pre-defined categories;
   splitting the content of the source message into a plurality of fragments defined by corresponding portions of the content of the source message associated with different ones of the recipients;
   generating a plurality of transport messages, each having content comprising one or more of the fragments associated with the one or more of the recipients and being addressed thereto, the transport messages containing corresponding aggregation information for aggregating the transport messages according to the corresponding recipients; and
   submitting the transport messages to a messaging server for causing the messaging server to provide the transport messages to corresponding further messaging clients of the corresponding recipients for aggregation thereof according to the corresponding aggregation information.

2. The method according to claim 1, wherein the method further comprises:
   grouping the fragments into a plurality of groups each comprising one or more of the fragments associated with the one or more of the recipients; and
   generating the transport messages corresponding to the groups each having the content comprising the fragments of the corresponding group.

3. The method according to claim 1, wherein the method comprises:
   generating a main one of the transport messages being addressed to all the recipients, the main transport message containing the corresponding aggregation information comprising an indication of the fragments of secondary one or more of the transport messages being different from the main transport message.

4. The method according to claim 3, wherein the method further comprises:
   generating the main transport message having the content comprising common one or more of the fragments being common to all the recipients.

5. The method according to claim 3, wherein the method further comprises:
   generating the main transport message having the content comprising corresponding placeholders in place of the fragments of the secondary transport messages.

6. The method according to claim 1, wherein the method further comprises:
   receiving a plurality of further transport messages having corresponding contents and containing corresponding further aggregation information for aggregating the further transport messages;
   generating a target message having a content obtained by aggregating the contents of the further transport messages according to the further aggregation information; and
   outputting a representation of the target message.

7. The method according to claim 6, wherein the method further comprises:
   receiving the further transport messages comprising a main further transport message and one or more secondary further transport messages, the content of each of secondary further transport messages comprising one or more further fragments and the further aggregation information of the main further transport message comprising an indication of the further fragments of the secondary further transport messages; and
   generating the target message having the content obtained by inserting the further fragments of the secondary further transport messages into the content of the main further transport message according to the further aggregation information.

8. The method according to claim 7, wherein the method further comprises:
   receiving the further main transport message with the content comprising corresponding further placeholders indicative of the further fragments of the further secondary transport messages; and
   generating the target message having the content obtained by inserting the further fragments of the further secondary transport messages into the content of the further main transport message in place of the corresponding further placeholders.

9. The method according to claim 1, wherein the source message and the transport messages are corresponding e-mails.

10. The method according to claim 9, wherein the content of each of the e-mails comprises a body, at least part of the segments and the fragments comprising corresponding pieces of the body.

11. The method according to claim 9, wherein the content of each of the e-mails comprises one or more attachments, at least part of the segments and the fragments each comprising one or more of the attachments.

12. A computer program product implementing a messaging client for exchanging messages over a communication network, the computer program product comprising one or more computer readable storage media having program instructions collectively stored in said one or more computer readable storage media, the program instructions readable by a computing system to cause the computing system to perform a method comprising:

creating a source message having a content and being addressed to a plurality of recipients associated with corresponding segments being at least in part different, each of the segments being defined by at least a portion of the content of the source message;

associating categorized one or more of the segments each with one or more selected categories of one or more pre-defined categories;

determining one or more of the recipients of the source message associated with each of the selected categories from an address book;

associating categorized one or more of the segments each with one or more selected categories of one or more pre-defined categories;

splitting the content of the source message into a plurality of fragments defined by corresponding portions of the content of the source message associated with different ones of the recipients;

generating a plurality of transport messages each having a content comprising one or more of the fragments associated with the one or more of the recipients and being addressed thereto, the transport messages containing corresponding aggregation information for aggregating the transport messages according to the corresponding recipients; and submitting the transport messages to a messaging server for causing the messaging server to provide the transport messages to corresponding further messaging clients of the corresponding recipients for aggregation thereof according to the corresponding aggregation information.

13. A system for exchanging messages over a communication network, wherein the system implements a messaging client comprising:

a user interface for creating a source message having a content and being addressed to a plurality of recipients associated with corresponding segments being at least in part different, wherein the source message comprises a plurality of segments; and wherein each of the segments being defined by at least a portion of the content of the source message;

a segmenter for selecting one or more categories of recipients from among the plurality of recipients to receive each of the respective segments;

a splitter for splitting the content of the source message into a plurality of fragments defined by corresponding portions of the content of the source message associated with different ones of the recipients;

the splitter for generating a plurality of transport messages each having a content comprising one or more of the fragments associated with the selected categories of recipients and being addressed to the respective recipients thereof, the transport messages containing corresponding aggregation information for aggregating the transport messages according to the corresponding recipients; and a sending agent for submitting the transport messages to a messaging server for causing the messaging server to provide the transport messages to corresponding further messaging clients of the corresponding recipients for aggregation thereof according to the corresponding aggregation information.

14. The system according to claim 13, wherein the message client is further adapted to:

group the fragments into a plurality of groups each comprising one or more of the fragments associated with the one or more of the recipients; and generate the transport messages corresponding to the groups each having the content comprising the fragments of the corresponding group.

15. The system according to claim 13, wherein the message client is further adapted to generate a main one of the transport messages being addressed to all the recipients, the main transport message containing the corresponding aggregation information comprising an indication of the fragments of secondary one or more of the transport messages being different from the main transport message.

16. The system according to claim 15, wherein the message client is further adapted to generate the main transport message having the content comprising common one or more of the fragments being common to all the recipients.

17. The system according to claim 15, wherein the message client is further adapted to generate the main transport message having the content comprising corresponding placeholders in place of the fragments of the secondary transport messages.

18. The system according to claim 13, wherein the message client is further adapted to:

receive a plurality of further transport messages having corresponding contents and containing corresponding further aggregation information for aggregating the further transport messages;

generate a target message having a content obtained by aggregating the contents of the further transport messages according to the further aggregation information; and output a representation of the target message.

19. The system according to claim 18, wherein the message client is further adapted to:

receive the further transport messages comprising a main further transport message and one or more secondary further transport messages, the content of each of secondary further transport messages comprising one or more further fragments and the further aggregation information of the main further transport message comprising an indication of the further fragments of the secondary further transport messages; and generate the target message having the content obtained by inserting the further fragments of the secondary further transport messages into the content of the main further transport message according to the further aggregation information.

* * * * *